United States Patent [19]

Schulz

[11] 4,042,083

[45] Aug. 16, 1977

[54] TORQUE CONVERTOR WITH CENTRIFUGAL LOCK UP CLUTCH

[75] Inventor: Willis Lorenz Schulz, Utica, Mich.

[73] Assignee: Borg-Warner Corporation, Chicago, Ill.

[21] Appl. No.: 636,518

[22] Filed: Dec. 1, 1975

[51] Int. Cl.² ............................................. F16H 45/02
[52] U.S. Cl. .......................... 192/3.31; 192/105 BA; 192/45.1
[58] Field of Search .......... 192/105 BA, 103 B, 41 A, 192/45.1, 3.31, 3.28

[56] References Cited

U.S. PATENT DOCUMENTS

| 2,106,423 | 1/1938 | Lavaud | 192/3.31 |
|---|---|---|---|
| 2,235,673 | 3/1941 | Dodge | 192/3.31 |
| 2,691,437 | 10/1954 | Dalrymple | 192/105 BA |
| 3,068,974 | 12/1962 | Jandasek | 192/3.31 X |

*Primary Examiner*—Benjamin W. Wyche
*Attorney, Agent, or Firm*—Robert L. Zieg

[57] ABSTRACT

A speed responsive engaging mechanism mounted in the central toroidal space in a hydrodynamic device adapted to couple the turbine and impeller members, including an annular support secured to the turbine member having a series of cam surfaces formed in the periphery thereof with a series of engaging devices or friction shoes mounted on said ramps. The friction shoes engage with a clutch element secured to the impeller member at a predetermined speed of rotation of the turbine element.

3 Claims, 3 Drawing Figures

TORQUE CONVERTOR WITH CENTRIFUGAL LOCK UP CLUTCH

BACKGROUND OF THE INVENTION

1. Field of the Invention

This application relates to the field of speed responsive engaging devices such as clutches.

2. Prior Art

It has been known in the prior art that it is desirable to have a clutch to lock the impeller and turbine elements of a hydrodynamic device together to eliminate slippage therebetween under certain conditions to improve the efficiency of the device. It is further known that it is convenient to use the speed of rotation of an element as a signal to initiate engagement and disengagement of the clutch. The engagement is critical, for example, when the lock-up clutch is used in a hydrodynamic device in combination with an automatic transmission. During an automatic ratio change, it is desirable that the clutch be disengaged so that torque changes occurring during the shift will not be harsh, due to the hydrodynamic device absorbing shocks. If the clutch in the hydrodynamic device remains engaged during a shift, the shift control to provide smooth shifts is more exacting since the normal shock adsorbing characteristic of the hydrodynamic device is eliminated.

As pointed out, it is known to utilize speed responsive clutches as lock-up clutches in a hydrodynamic device. Normally, to insure that such clutches are engaged at the proper time, expensive and complicated controls of the mechanical, electric, or hydraulic type are provided. Controls have been used to insure that the lock-up clutch is not engaged during an automatic shift. In addition, the clutch structures performing such functions are normally in themselves quite complicated.

In addition, lock-up clutches for a hydraulic torque converter as known in the prior art normally require modification of the torque converter structure to enlarge same to provide space for the lock-up clutch.

Accordingly, it is an object of the present invention to provide a clutch mechanism for a hydraulic torque converter which can be incorporated within the hydraulic torque converter with no requirement of increased axial or radial dimensions of the torque converter mechanism.

It is a further object of the present invention to provide a lock-up clutch which will engage and disengage at the proper time without the use of external control mechanisms to determine the points of engagement and disengagement. An additional object of the present invention is to provide a speed and torque responsive clutch in a hydrodynamic device which can be physically accommodated within the central toroidal space in the hydrodynamic device. Further, it is an important object of the present invention to provide a lock-up clutch for a hydrodynamic device which will automatically permit speed differentials within the device during specific operating conditions such as ratio change.

SUMMARY OF THE INVENTION

The present invention achieves the above-enumerated objects by utilizing a speed and torque responsive, self-energizing wedge type engagement of friction shoes in a clutch mechanism mounted in the central toroidal space in a hydrodynamic device. An annular sheet metal ring is provided, secured to the core ring of the turbine member of the hydrodynamic device, which has formed therein a series of ramp-like depressions, each containing a friction shoe with a friction lining thereon. Centrifugal force moves the shoes radially outwardly to engage an inner annular surface on an annular member secured to the core ring of the impeller member. A series of leaf springs are connected to the annular ring secured to the turbine and engage the friction shoes to resist their outward radial movement.

Since the clutch mechanism is mounted entirely within the central and toroidal space in the hydrodynamic device, the invention provides a lock-up clutch having all of the desired characteristics set out herein which can be added to a hydrodynamic device without increasing the axial or radial dimensions of the hydrodynamic device.

After initial frictional engagement of the shoes, the ramp-like depressions in which the shoes are mounted provide a wedging effect to urge the shoes into engagement. A hysteresis effect is provided, since the shoes will disengage due to the wedging action at a lower speed of rotation than that at which they engaged. In addition to the leaf springs, a coil spring is mounted in a bore in each of the friction shoes to resist movement of the friction shoes with respect to the ramp.

In addition to the hysteresis effect of the wedging engagement, the present invention further provides a torque sensitive function. It has been found that in torque surges which will occur on upshafts in an automatic transmission, the capacity of the lock-up clutch is such that it will momentarily permit speed difference between the impeller and turbine elements. Additionally, in torque reversal conditions, such as will occur during a downshift when the torque tends to flow momentarily from the turbine member to the impeller member as opposed to the normal flow from the impeller member to the turbine member, the friction shoes momentarily permit speed difference between the impeller and turbine members. It is to be understood that such permission of speed difference (or slipping) between turbine and impeller elements by the lock-up clutch will be characterized herein as a release of the clutch, although the friction shoes may remain in contact during this condition. The automatic release during ratio change is extremely important to maintain the shock absorbing function of the torque converter during such ratio changes.

BRIEF DESCRIPTION OF PREFERRED EMBODIMENT

Figure 1:
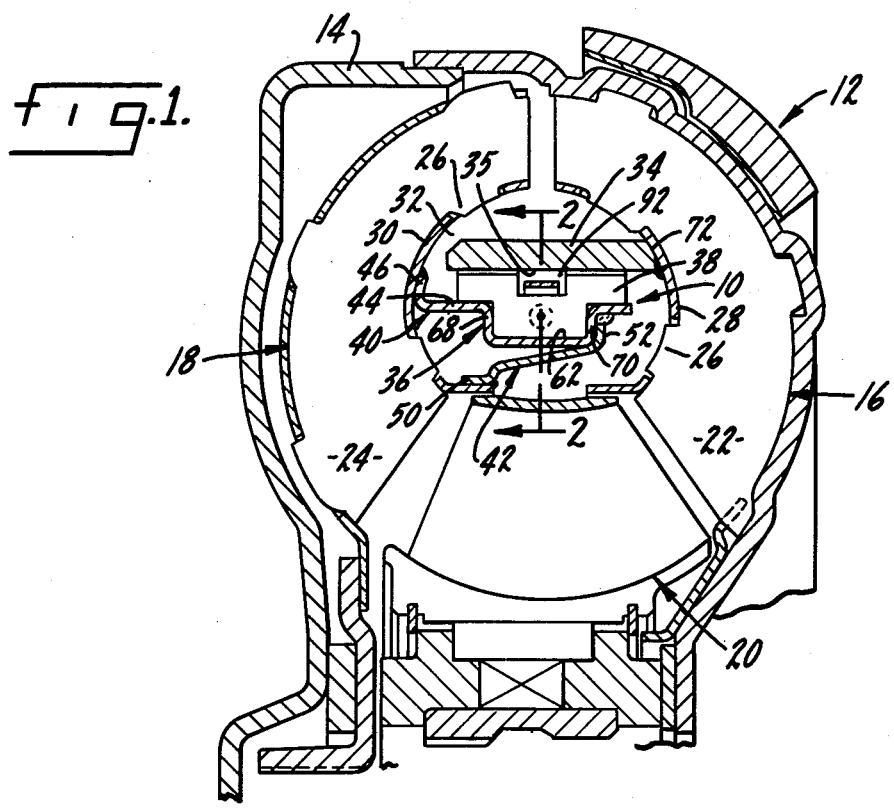
FIG. 1 is a cross-sectional view through a hydraulic torque converter structure having a speed responsive clutch embodying the principles of the present invention.

Referring to FIG. 1, an improved lock-up clutch or engaging mechanism 10 is illustrated. Clutch 10 is shown in location in a hydrodynamic device 12 of the type normally referred to in the art as a hydraulic torque converter, having a drive shell 14 connected to drive a vaned impeller member 16 in a known manner. Hydraulic torque converter 12 includes a vaned turbine element 18 driven hydrodynamically by the impeller element 16 and a stator element 20. In accordance with well-known prior art constructions, the turbine and impeller elements are comprised of a plurality of sheet metal blades defining fluid flow paths through the elements. For example, impeller 16 includes a plurality of sheet metal blades 22 and turbine 18 includes a plurality of sheet metal blades 24. As is also known in the prior art, blades 22 and 24 include inner extending tabs 26 which are utilized in manufacture of the device to secure the blades to central annular sheet metal parts known as core rings. As illustrated in FIG. 1, impeller 22 has a core ring 28 which receives tabs 26 in which the tabs are secured by being bent over. Likewise, turbine member 18 includes core ring 30 having slots receiving tabs 26, blades 24 being secured thereto by bending. This method of construction is illustrated, for example, in U.S. Pat. No. 2,692,561 of common assignee.

Centrally of core rings 28 and 30 and centrally of the impeller, turbine, and stator elements, a toroidal space 32 is defined in which lock-up clutch 10 of the present invention is conveniently located. Clutch 10 is generally comprised of an annular sheet metal clutch member 34, an annular sheet metal clutch or support member 36, and a plurality of engaging devices or friction shoes 38. Clutch member 34 is secured to core ring 28 of impeller 16, for example, by welding. Likewise, clutch member or support member 36 is secured to core ring 30 of turbine 18, for example, by welding. It should be noted that spot, arc, electron beam, or other known welding techniques could be used to secure the clutch members to their respective core rings. In addition, the clutch members can be secured to their core rings by well-known brazing techniques, which are sometimes utilized in the manufacture of hydraulic torque converters.

Figure 2:
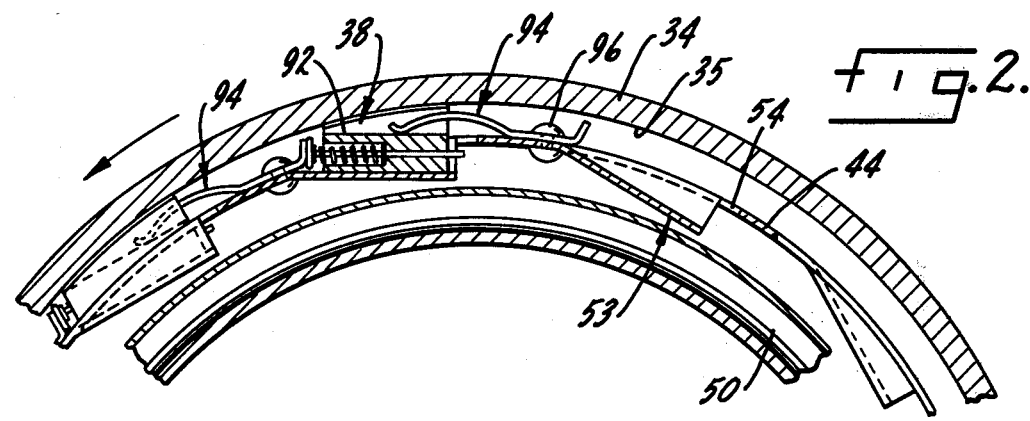
FIG. 2 is a cross-sectional view taken along the lines 2—2 of FIG. 1.

Clutch member 36 is comprised of two annular sheet metal parts 40 and 42, which are best illustrated in FIG. 1. Part 40 includes a generally horizontal section 44 and a generally vertically extending portion 46, the portion 46 being slightly curved to conform with the curvature of core ring 30. Member 42 includes an axially extending portion 50 and a generally vertically extending portion 52. As illustrated in FIG. 2, a series of ramps 53 are formed by punching slots 54 in portion 44 of element 36 by means of which ramps 53 are formed, ramps 53 having a longitudinal bottom portion 60 having an engaging ramp surface 62 and side portions 68 and 70.

As illustrated in FIG. 1, the vertically extending portion 52 of element 42 conforms to portion 70 of ramp 53 and axially extending portion 50 of element 42 is adapted to mate with the horizontal portion of core ring 30 in construction of clutch member 36. Parts 40 and 42 may be joined together before securing same to core ring 30. Elements 40 and 42 may be joined together by any of the known welding techniques or by brazing. Sections 46 of member 36 and 50 of member 42 may be secured to core ring 30 likewise by any of the known welding techniques or by brazing.

Figure 3:
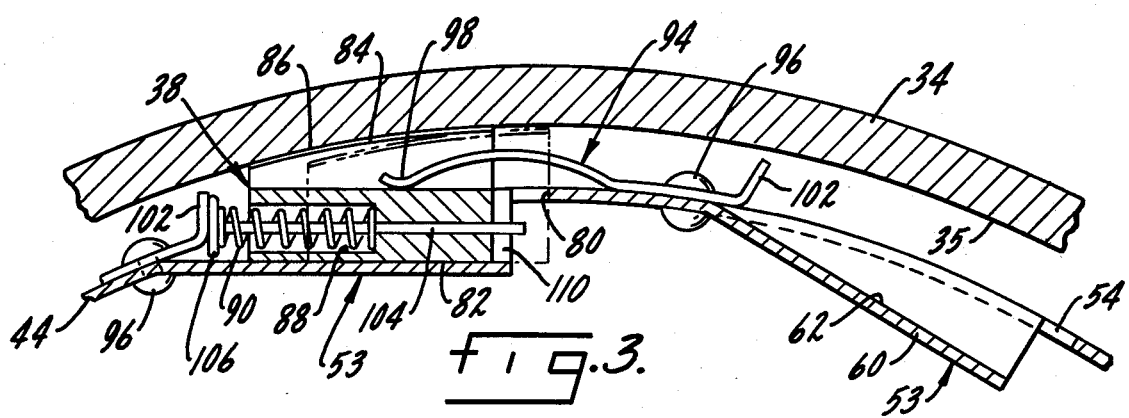
FIG. 3 is an enlarged sectional view of a portion of FIG. 2.

Clutch member 34 is also within toroidal space 32 and is secured to core ring 28. Clutch member 34 includes an inner annular surface 35 and includes corner portion 72 which is curved to conform to the shape of core ring 28. Clutch member 34 can also be secured to core ring 28 by welding and/or brazing as described above, In the formation of ramps 53 by punching out slots 54, an abutting surface 80 is formed in the area of the ramps. As illustrated in FIGS. 2 and 3, friction shoes 38 are mounted on ramps 53, the friction shoes being of generally rectangular shape having a lower flat surface 82 engaging ramp surface 62 and an arcuate engaging surface 84 adapted to engage with clutch member 34 and in a preferred embodiment having a friction lining 86 on surface 84. Friction shoes 38 have a bore 88 therein adapted to receive a coil spring 90. The shoes 38 have a longitudinally extending groove 92 formed in surface 84. A series of leaf springs 94 are provided, each secured to member 36 by rivets 96. The leaf springs have an engaging portion 98 and a reaction portion 102 extending generally vertical to spring 94.

A rod member 104 is mounted within the friction shoes adapted to be received by the center of coil spring 90 and having a round flat head 106 thereon which in assembly engages reaction portion 102 of an adjacent spring 94, thus retaining coil spring 90 in bore 88 and, in addition, providing a reaction surface for the spring such that the springs can resist movement of shoes 38 up ramps 53. Engaging portion 98 of leaf spring 94 which is received in grooves 92 also acts on friction shoes 38 resisting outward movement of shoes 38.

The shape and construction of the shoes 38, leaf springs 94 and the ramps 52 and operational characteristics of the device are more particularly described in copending application Ser. No. 620,462 filed Oct. 7, 1975 and of common assignee, and the disclosure thereof is incorporated herein by reference.

The operation of the lock-up clutch 10 of the present invention is that when a predetermined speed of turbine 18 is reached, sufficient centrifugal force acts on the shoes 38 to urge them radially outwardly against the force of springs 90 and 94, tending to engage arcuate friction surface 86 with the annular inner surface 35 on clutch member 34. At this time, the friction shoes 38 will attempt, through frictional engagement with clutch member 34, to lock turbine 18 to impeller 16. This frictional engagement energizes the device such that ramps or cams 53 tend to further engage friction shoes 38 by means of a wedging action. Clutch 10 is thus self-energizing in the engaging direction, due to the wedging effect of ramps 40 and 38.

Referring to FIGS. 2 and 3, between the engaged and disengaged positions of shoes 38, the shoes move in a substantially circumferential direction as illustrated by space 110 between surface 80 and the end of the shoe 38. It should be noted that the direction of rotation of the engine of the vehicle and thus the direction of rotation of element 34 as viewed in FIG. 2 is counterclockwise as indicated by the arrow. The full line showing of shoe 38 in FIG. 3 illustrates shoe 38 in its engaged position while the phantom line showing of shoe 38 illustrates shoe 38 in its disengaged position with the end of the shoe against surface 80.

The substantially circumferential movement of shoes 38 is comprised of both arcuate movement with respect to clutch member 34 as well as chordal movement of shoes 38 with respect to clutch member 34 along ramp surface 62. This movement of shoes 38 represents the wedging action of shoe 38 during engagement.

It has been found that due to the wedging action, a desired hysteresis effect is inherent in the present structure in that, although the device tends to lock up and engage the friction shoes 38 at a predetermined RPM, the wedging action holds the shoes 38 in engagement such that they will not come out of engagement due to action of springs 90 and 94 until a lower RPM than the engaging RPM is reached. As, for example, in one test of the device in the form described in copending application Ser. No. 620,461 mentioned above, under dynamometer conditions, it has been shown that clutch 10 would lock up between 1600 and 1660 RPM, and that under the same conditions of torque load, clutch 10 did not release upon a decrease in RPM until an RPM range of between 1550 and 1450 was reached. Thus, due to the wedging engagment of friction shoes 38, hunting, i.e., rapid changes between lock up and released conditions of lock-up clutch 10 are prevented.

It is to be understood that the use of the term "disengaged" herein is meant to indicate a condition in which shoes 38 move radially inwardly out of contact with surface 35. When the term "released," as applied to clutch 10, is used herein, it is intended to include a condition in which shoes 38 may still be in contact with surface 35 but the engaging forces are such that slipping of surface 35 with respect to shoes 38 may take place, or, in other words, turbine 18 and impeller 16 may rotate at different speeds. Of course, the term "released" is also meant in its broad sense to include the "disengaged" condition described above.

As more particularly described in the aforementioned copending application Ser. No. 620,461, anytime the throttle of the vehicle is suddenly depressed to demand higher torque, the torque capacity of clutch 10 may be exceeded causing clutch 10 to release and allowing the hydraulic torque converter to return to slipping condition, which is desired at such times. This condition may also occur on upshifts when a sudden urge or increase in torque will occur momentarily, as explained previously.

When a torque reversal occurs in the drive-line, due to the inherent characteristics of clutch 10, the wedging effect is removed, and the torque capacity of clutch 10 drops. This explains why the clutch momentarily releases on downshifts, since a torque reversal occurs at such times. As previously explained, during shifting, release of clutch 10 is desired to allow the converter to return to its shock absorbing characteristics.

It has also been illustrated during test work that upon shifting or ratio changing in an automatic transmission with the present device installed, the torque pulse or reversal which occurs during a shift allows the lock-up clutch 10 to release under these conditions. This inherent feature of the present design is extremely important in that automatic shifts are much smoother when a hydraulic torque converter is operating in its released or normal manner; and if a torque converter is locked up, as, for example, by a lock-up clutch at the time of the shift, the shift could be much harsher than desirable.

As stated earlier, shoes 38 have a friction lining 86 thereon which may be of a paper type. It is contemplated that one embodiment of the present device may have shoes 38 made of aluminum and support 36 of sheet steel. It will be apparent that the coefficient of friction of the friction lining is different from that of the shoe 38 on surface which engages ramps 53. Thus, with the present invention, the device may be altered to have different engaging characteristics by changing either the material of the friction lining or the material of shoe 38, or both. It has been found that it is highly desirable to have the friction lining of higher coefficient of friction than the lower surface of the shoes so that the force required to move the shoes with respect to ramps 53 will be less than that to move shoes 38 with respect to surface 35 considering equal normal forces between shoes 38 and ramps 40 and between shoes 38 and suface 35.

As described herein, support 36 including parts 40 and 42 is a single annular assembly, made of sheet metal, and having ramps 53 formed therein by sheet metal forming techniques. It is contemplated that clutch 10 could be constructed with ramps 53 formed of individual sheet metal structures, each separately secured to core ring 30 of turbine 18 by welding or other known techniques. In addition, it is apparent that alternative forms of spring devices may be used to urge shoes 38 down ramps 53 and out of engagement with surface 35. For example, a single garter type spring could encircle all of shoes 38 and urge them out of engagement, grooves 94 in shoes 38 in such case being of appropriate depth to accommodate the garter spring.

From the above, it will be apparent that the present invention provides a speed responsive clutch which achieves unique results as a lock-up clutch for an hydrodynamic device having all the desired operating characteristics for a clutch in this environment yet involves very few parts. These characteristics, achieved by the present invention, are: lock up of turbine and impeller elements at proper times; release during automatic ratio change to use the natural shock absorbing features of the hydrodynamic device; no hunting between engaged and released conditions; smooth engagement and disengagement; and no requirement for complex mechanical, hydraulic, or electronic speed-sensitive controls to properly time engagement and disengagement. In addition, no dimensional modifications of the hydrodynamic device are necessary since the entire clutch 10 fits within the normally existing toroidal space in the center of the hydrodynamic device.

What is claimed is:

1. In a hydrodynamic device having a fluid impeller and a turbine with a space therebetween, a clutch mechanism in said space comprising a first annular clutch member connected to said impeller and having a clutch surface thereon, a second clutch member comprising an annular ring secured to the turbine having a plurality of ramp areas formed therein having ramp surfaces formed from the material of the ring thereon, friction means mounted in said ramp areas and in contact with and supported by said ramp surfaces between said ramp surfaces and said clutch surface, centrifugal force acting to urge said friction means into engagement with said clutch surface at a given speed of rotation to lock said elements together, said ramp surfaces acting after initial engagement of said devices to wedge said devices between said first and second clutch members, said second clutch member comprises an annular sheet metal continuous ring having said ramp areas and surfaces formed therein.

2. The device of claim 1, wherein said friction means comprises a plurality of friction shoes having an arcuate friction surface.

3. The device of claim 1, including spring means on said second clutch member in contact with said shoes urging said shoes radially inwardly.

* * * * *